(12) United States Patent
Mannhart et al.

(10) Patent No.: US 11,255,471 B2
(45) Date of Patent: Feb. 22, 2022

(54) PIPE COUPLING

(71) Applicant: Straub Werke AG, Wangs (CH)

(72) Inventors: Hubert Mannhart, Sargans (CH);
Damir Sudar, Bad Ragaz (CH)

(73) Assignee: STRAUB WERKE AG, Wangs (CH)

( * ) Notice: Subject to any disclaimer, the term of this patent is extended or adjusted under 35 U.S.C. 154(b) by 238 days.

(21) Appl. No.: 16/495,607

(22) PCT Filed: Mar. 30, 2018

(86) PCT No.: PCT/IB2018/052228
§ 371 (c)(1),
(2) Date: Sep. 19, 2019

(87) PCT Pub. No.: WO2018/178946
PCT Pub. Date: Oct. 4, 2018

(65) Prior Publication Data
US 2020/0011459 A1 Jan. 9, 2020

(30) Foreign Application Priority Data

Mar. 31, 2017 (EP) ..................................... 17164165

(51) Int. Cl.
*F16L 21/00* (2006.01)
(52) U.S. Cl.
CPC .................................. *F16L 21/005* (2013.01)
(58) Field of Classification Search
CPC ......... F16L 21/06; F16L 21/065; F16L 21/00; F16L 21/002; F16L 21/005; F16L 17/04
USPC .......................... 285/236, 373, 419, 104, 112
See application file for complete search history.

(56) References Cited

U.S. PATENT DOCUMENTS 6,490,765 B2 * 12/2002 Anthes .................... F16L 33/04
24/279
8,292,331 B2 10/2012 Sudar
2010/0283236 A1 11/2010 Sudar

FOREIGN PATENT DOCUMENTS

| DE | 69131402 T1 | 2/2000 |
| DE | 20209784 U1 | 10/2002 |
| EP | 0667476 A2 | 8/1995 |
| EP | 1245889 A1 | 10/2002 |
| EP | 1767842 B1 | 6/2008 |

(Continued)

OTHER PUBLICATIONS

International Search Report for corresponding PCT Application No. PCT/IB2018/052228, 6 pages, dated Jun. 26, 2018.

*Primary Examiner* — Aaron M Dunwoody
(74) *Attorney, Agent, or Firm* — Matthew B. Dernier, Esq.

(57) ABSTRACT

A pipe coupling for connecting two pipe ends includes: a clamp band which has a longitudinal slot, an inner housing arranged therein, and a clamping mechanism for reducing the internal diameter of the clamp band. The clamp band is designed as a flat single piece and has an outer band portion and inner band portions which are connected to the outer band portion via at least one connection. A connection assembly is provided for securing the inner housing in the clamp band, where the connection assembly includes a first connection part and a second connection part. The first connection part extends into the second connection part, and at least one of the connection parts of the connection assembly is designed to connect the at least first outer band portion to the at least first inner band portion of the clamp band.

13 Claims, 8 Drawing Sheets

(56) References Cited

FOREIGN PATENT DOCUMENTS

| GB | 2470276 A | 11/2010 |
| WO | 2009107061 A1 | 9/2009 |
| WO | 2013118079 A1 | 8/2013 |

* cited by examiner

PIPE COUPLING

BACKGROUND

The invention relates to a pipe coupling, as well as to a clamp band.

Pipe couplings are used in a wide variety of applications for the fluid-tight connection of two pipe ends. They are manufactured in high quantities, since depending on their use in the industrial sector, for example in shipbuilding or at industrial plants, a plurality of pipe couplings are assembled. The pipe couplings must here meet the corresponding standards and stringent mechanical requirements.

Known from DE 691 31 402 T2 (EP 0 667 476 B1) is a pipe coupling comprising an inner casing pipe and an outer casing pipe with a clamping means, wherein the two casing pipes are arranged one directly inside the other. The axial end edges of the two casing pipes are inwardly bent, and each form a side flange. The side flange of the outer casing pipe limits the axial movement of the inner casing pipe, and the side flange of the inner casing pipe limits the axial movement of a gasket arranged therein.

The disadvantage to this known solution is that the outer casing pipe comprising the clamp band as well as the inner casing pipe comprising the inner housing require a complicated manufacture. In this pipe coupling, the manufacturing processes must be adjusted in such a way that the inner casing pipe fits into the outer casing pipe. In addition, the assembly of this pipe coupling is very complicated and time-consuming.

Known from EP 1 767 842 B1 is a pipe coupling with a housing consisting of segments spaced apart from each other, with an elastic ring arranged inside of the housing, and with a tightening band, which is tightened by means of a fastening unit. The elastic ring has several gripping projections, which engage into respective positioning holes of the housing segments. The outer shell surfaces of the individual housing segments have guiding parts for guiding the tightening band.

The disadvantage to the known solution is that the inner housing consists of several individual segments spaced apart from each other. The already complicated process of assembling the pipe coupling is massively hampered, since the housing segments on the elastic ring are individually arranged, and must subsequently be enveloped by the tightening band. During the process of clamping the individual housing segments, there is the danger that the elastic ring serving as the sealing insert will become deformed to more than the desired extent, and squeezed between the housing segments. This inevitably results in damage to the elastic ring, causing the pipe coupling to develop a leak and have to be changed.

WO 2013/118079 A1 shows a pipe coupling comprising a dual-layer clamp band with a clamping mechanism, wherein the two free ends of the outer band of the clamp band are connected with the inner band of the clamp band by means of rivets.

GB 2 470 276 A shows a clamp band with an outer and an inner side, with a clamp band enveloping most of its circumference, the end regions of which are designed as loops with free ends bent around the inner side of the clamp, wherein the overlapping region of the loops is connected with the clamp band at a respective connection site.

DE 202 09 784 U1 shows a pipe clamp for connecting two pipe ends with a clamping mechanism on a clamp casing and with metal strips fastened to the inside of the clamp casing as anchoring rings. The clamp casing consists of one layer, and is positively connected with the metal strip. For this purpose, the clamp casing has several brackets, into which the respective ends of the metal strips extend.

The disadvantage to this known solution is that the metal strips are fixed on the inside of the clamp band, so that the latter cannot be positioned as desired while assembling the pipe clamp at the respective pipe ends.

SUMMARY

The object of the present invention is to create a pipe coupling as well as a clamp band that do not have the aforementioned disadvantages, and in particular can be easily and quickly assembled during applications under difficult conditions.

The object is achieved by the features in the independent claims. Advantageous further developments are described on the figures and in the dependent claims.

According to the invention, a pipe coupling for connecting two pipe ends comprises a clamp band and at least one inner housing arranged at least regionally therein, wherein the clamp band has a longitudinal slot as well as a clamping mechanism for reducing the internal diameter of the clamp band. The clamp band is further designed as a flat, single piece, and has at least one first outer band portion and at least one first inner band portion, which are connected via at least one connection means. Further provided is a connection assembly for securing the at least one inner housing in the clamp band, which consists of at least one first connection part and at least one second connection part, wherein the at least one first connection part extends into the at least one second connection part, and at least one of the connection parts of the connection assembly is designed as the at least one connection means for connecting the at least one first outer band portion to the at least one first inner band portion of the clamp band.

This ensures a defined positioning of the at least one inner housing in the clamp band of the pipe coupling. During the assembly process, for example, the at least one inner housing of the pipe coupling is arranged in the area of the two pipe ends to be connected, after which the clamp band is positioned on at least one inner housing by means of the connection assembly, thereby enabling a simple assembly of the pipe coupling, and for example preventing contamination in the area between the at least one inner housing and the clamp band. A robust and tight pipe connection that can also withstand high axial loads is here to be created.

The at least one connection means is advantageously arranged on the clamp band. This measure makes it possible to cost-effectively manufacture this pipe coupling in a few steps.

At least one of the connection parts preferably has a recess. This recess, which can also be designed as a depression, makes it easier for the one connection part to engage into the other connection part of the connection assembly, and enables a rapid assembly of the pipe coupling.

The at least one of the connection parts is preferentially designed as an opening, as a result of which the additional connection part engages completely into the other connection part of the connection assembly, and contaminants, for example liquids (rainwater, seawater, chemicals, etc.), are prevented from accumulating in the connection part.

At least one of the connection parts is preferably designed as a round hole, as a result of which the at least one inner housing can be easily positioned relative to the clamp band during assembly.

Alternatively, at least one of the connection parts is designed as a oblong hole, as a result of which the position of the clamp band and the at least one inner housing can be readjusted relative to each other during the assembly process along a direction defined by the oblong hole, so that in particular assembly circumstances can be easily considered. For example, the at least one inner housing can first be arranged first at one pipe end or directly at the two pipe ends to be connected, and the clamp band can be aligned based on the oblong hole so as to enable an aligned, and thus simple, assembly of the pipe coupling. As a consequence, this pipe coupling can be flexibly used for various applications. For example, the at least one oblong hole runs along or inclined to the shell surface of the at least one inner housing or the clamp band, thereby enabling a displacement or twisting of the clamp band or the at least one inner housing. This creates multiple applications for the pipe coupling. For example, the at least one oblong hole runs along a curve on the shell surface of the at least one inner housing or the clamp band, thus providing the variability in the angulation of the pipe ends to be connected relative to each other, and compensating for the longitudinal axis misalignment of the two pipe ends that come together.

Alternatively, at least one of the connection parts is designed as a round hole, and at least one of the connection parts is designed as an oblong hole. For example, the at least one inner housing becomes adjustable along the oblong hole relative to the clamp band, wherein the round hole serves as a fulcrum. This additional adjustment option reduces undesired bracings in the pipe coupling. As a result, the positioning of the at least one inner housing relative to the clamp band during assembly is simplified on the one hand, and possible contamination in the area of the connection parts can be easily removed on the other.

In the assembled state of the connection assembly, the at least one connection part preferentially engages precisely into the at least one second connection part. For example, given a round hole as the at least one second connection part, a cam or projection is advantageously used as the at least one first connection part. Given an oblong hole as the at least one second connection part, a web can also be used as an alternative to a cam or projection as the at least one first connection part. This type of measure improves the clamping force of the pipe coupling, since bracing the clamping mechanism of the pipe coupling reduces the inner diameter of the at least one inner housing nearly free of play. In addition, higher clamping forces can be transferred to the at least one inner housing, so that thinner clamp band materials can simultaneously be used, since the at least one inner housing helps to bear the forces that arise during the transfer. The low material requirement makes it possible to lower the manufacturing costs of the pipe coupling, which offers a significant advantage in a mass product such as the pipe coupling.

In the joined state of the connection assembly, the at least one connection part preferably extends over the at least one second connection part, wherein the protruding section can serve to fix in place an additional part of the pipe coupling or a part to be arranged on the pipe coupling. For example, in a section that extends radially inward, it can serve to fix in place a sealing insert arranged in at least one inner housing. For example, in a section that extends radially outward, it can serve to fix in place a casing, for example a fireproof casing (fire protection), on the pipe coupling.

The at least one first connection part is preferentially arranged on the clamp band and the at least one second connection part on the at least one inner housing, thereby making it easy to secure the at least one inner housing relative to the clamp band, and accelerating the assembly process. The at least one first connection part is here advantageously designed as a projection, which extends into the at least one second connection part advantageously designed as a depression or as an opening.

Alternatively, the at least one first connection part on the clamp band is designed as a depression or as an opening, into which extends the at least one second connection part of the at least one inner housing designed as a projection. This measure makes it possible to externally check a defined positioning of the clamp band relative to the at least one inner housing.

Alternatively, the clamp band and the at least one inner housing each have both at least one first connection part as well as at least one second connection part. This measure simplifies the assembly of the pipe coupling, for example since a specific configuration is provided in the assembled state of the pipe coupling. The at least one first connection part is here advantageously designed complimentarily to the at least one second connection part.

Alternatively, the at least one connection means is arranged on at least one inner housing, making it possible to adjustably connect the at least one inner housing with the clamp band, and thereby at least reduce undesired bracings between the at least one inner housing and the clamp band. For example, a driving means of the detachable connection means arranged outside on the clamp band is used to detach the bracings between the at least one inner housing and the clamp band.

At least one of the connection parts preferentially has a detachable design, which makes it possible to temporarily and/or adjustably secure the at least one inner housing with the clamp band. Temporarily securing the at least one inner housing with the clamp band simplifies the assembly of the pipe coupling during the clamping process. Subsequently detaching at least one of these connection parts results in a reduction in undesired bracings in the pipe coupling. The detachable embodiment of at least one of the connection parts further makes it possible to displace the clamp band relative to the at least one inner housing within a defined framework.

The connection assembly preferably has at least one connection means for connecting the at least first outer band portion with the at least first inner band portion of the clamp band, making it possible to realize a simple and cost-saving production of the pipe coupling. In this embodiment, for example, the connection assembly has a respective opening as the at least one first and the at least one second connection part, along with at least one connection means (bolt, screw, rivet, etc.), which advantageously is arranged radially outward on the pipe coupling. The connection assembly thereby connects both the outer band with the inner band of the clamp band, while at the same time securing the at least one inner housing on all sides against undesired spatial positionings.

At least one first connection part of the connection assembly is preferentially formed on the clamp band, and at least one second connection part of the connection assembly on at least one inner housing as the opening, wherein the at least one connection means for detachably connecting the clamp band with the at least one inner housing extends through the respective openings. This makes it possible to prevent undesired bracings in the pipe coupling.

The at least one connection means advantageously has a stop, which abuts against at least one inner housing. The at least one connection means advantageously further extends through the two openings, as well as advantageously further via the two openings radially outward opposite the direction toward the longitudinal axis of the clamp band. The at least one connection means has a driving means for detachably connecting the at least one inner housing with the clamp band, so that any bracings between the at least one inner housing and the clamp band can be detached.

The connection assembly is preferentially arranged in an area opposite the longitudinal slot of the clamp band, thereby enabling a simple and symmetrical manufacture of the clamp band with an advantageous force transfer.

The two ends of the clamp band are preferentially arranged by abutment, as a result of which the clamp band is double-layered over a majority of its circumference. This measure produces a high clamping effect at a low material outlay, which acts along nearly the entire circumference of the clamp band and allows the production of a robust pipe coupling.

Alternatively, the two ends of the clamp band are arranged by abutment, and the connection assembly is arranged in an area opposite the longitudinal slot of the clamp band. This measure produces a high clamping effect, which acts along nearly the entire circumference of the clamp band, with a constant clamping effect further being exerted along the circumference of the clamp band.

The two ends are preferably arranged by abutment externally on the inner band portion of the double-layered clamp band, thereby enabling a simple manufacture even given high quantities, and making it easy to check the pipe coupling for damage in the assembled state.

Alternatively, the two ends of the clamp band are arranged by abutment internally on the outer band portion of the double-layered clamp band, which improves the clamping effect of the clamp band, since the outer band presses uniformly on the two ends of the clamp band.

The connection assembly is preferentially designed as a positive connection, thereby enabling a cost-saving manufacture while ensuring a high level of safety for the connection.

Alternatively, the connection assembly is designed as a non-positive connection, making it possible to adjustably brace the at least first connection part with the at least second connection part.

Alternatively, the connection assembly is designed both as a positive connection and a non-positive connection. This measure makes it possible to realize special embodiments, which make detachable connection parts and easily manufacturable connection parts combinable, and optimizable to the respective application. An especially versatile and highly loadable pipe coupling is provided as a result.

The at least one inner housing preferably has a longitudinal slot, so that the inner diameter of the at least one inner housing can be reduced while bracing the pipe coupling, and the clamping effect of the at least one inner housing or the pipe coupling can additionally be set.

The at least one inner housing preferentially has at least one side flange, thereby creating a receiving space for an insert, for example for a sealing insert, in the at least one inner housing. As a result, the insert can be easily positioned in the at least one inner housing.

Alternatively, the at least one inner housing has at least one longitudinal slot as well as at least one side flange, thereby resulting in a combination of the aforementioned advantages.

The at least one inner housing preferably has a smaller inner housing width along its longitudinal axis than a clamp band width of the clamp band, so that the clamp band in the braced state of the pipe coupling exerts an elevated clamping force on the at least one inner housing, and a robust pipe coupling is realized, in particular for a broad range of industrial applications.

Alternatively, the at least one inner housing has both a smaller inner housing width along its longitudinal axis than a clamp band width of the clamp band and a longitudinal slot, as a result of which the advantages associated therewith are present in combined fashion.

Additionally or alternatively to the longitudinal slot, the at least one inner housing has both a smaller inner housing width along its longitudinal axis than a clamp band width of the clamp band and at least one side flange, as a result of which the advantages associated therewith are present in combined fashion.

In an alternative embodiment of the pipe coupling, the clamp band has at least one connection part, which advantageously is designed as an opening or a depression, and at least one additional first connection part, which advantageously is designed as a projection, which protrudes radially inward in the direction of the longitudinal axis of the clamp band. In this alternative embodiment, the at least one inner housing further has at least one second connection part, which advantageously is designed as a projection and protrudes outwardly, as well as at least one additional second connection part, which is designed as a depression or as an opening. The at least one second connection part of the at least one inner housing is here designed in such a way as to engage into the at least first connection part of the clamp band. The at least one additional first connection part of the clamp band is further designed so as to engage into the at least one additional second connection part of the at least one inner housing. Reciprocally securing the at least one inner housing with the clamp band makes it possible to better brace the at least one inner housing with the clamp band, and to manufacture a robust pipe coupling that reliably connects the pipe ends.

In another alternative embodiment, the connection assembly comprises several first connection parts and several second connection parts, thereby enabling an improved positioning of the at least one inner housing with the clamp band.

At least one of the first connection parts in the clamp band preferentially protrudes over the material thickness of the at least one inner housing, and engages into an advantageously elastic sealing insert, as a result of which this sealing insert can be fixed in place by means of the at least one connection part.

In an alternative embodiment of the pipe coupling, the pipe coupling, aside from a clamp band and the at least one inner housing arranged at least regionally therein, has at least one additional inner housing, wherein the at least one additional inner housing is likewise arranged at least regionally in the clamp band. As a consequence, the respective pipes to be connected are each enveloped by at least one inner housing, and are simply held by the pipe coupling. In addition, this enables an expanded angulation of the two pipes in the pipe coupling in the connected state.

The at least one additional inner housing advantageously has at least one first connection part of the connection assembly or at least one second connection part of the connection assembly, which extends into at least one correspondingly designed second or first connection part. As a result, the one additional inner housing can also be secured by the connection assembly, and a flexible structural design of the connection assembly is possible.

Alternatively, the one additional inner housing has at least one first connection part of the connection assembly and also at least one second connection part of the connection assembly, so that the connection assembly is able to better secure the at least one additional inner housing. Reciprocally securing the at least one additional inner housing with the clamp band makes it possible to better brace the at least one inner housing with the clamp band, and to more easily and economically manufacture a robust pipe coupling.

One of the connection parts of the connection assembly is preferably designed as an oblong hole, which is aligned along the longitudinal axis of the pipe coupling. As a result, the position of the clamp band and/or of the at least one inner housing can be adjusted relative to the at least one additional inner housing. If necessary, the clamp band can thus be readjusted along a direction defined by the oblong hole. The oblong hole makes it possible to flexibly balance the axial movements of the pipes to be connected. For example, the at least one oblong hole runs along a curve on the shell surface of the clamp band, which permits an enlarged angulation region of two sequential pipes in the pipe coupling.

As described in claim 13 of the invention, a clamp band, in particular for use in a previously described pipe coupling, has a longitudinal slot, wherein the clamp band is designed as a single, flat piece. The clamp band further has at least one outer band portion and at least one first inner band portion, which are connected by at least one connection means. In addition, the clamp band has at least one first connection part of a connection assembly on the clamp band for securing at least one inner housing in the clamp band, wherein the connection assembly comprises at least one second connection part aside from the at least one first connection part, wherein the at least one first connection part of the connection assembly is formed by the at least one connection means. As a result, various inner housing designs (e.g., tubular or polygonal) can be secured as needed, in particular when used in a pipe coupling for connecting pipe ends according to claim 1.

The connection assembly preferably has the at least one connection means for connecting the at least one outer band portion with the at least one first inner band portion, so that a simple and cost-saving manufacture of the clamping band can be realized.

The connection means is preferentially designed as a positive connection, which enables a cost-saving manufacture while ensuring a high level of safety for the connection, even given large quantities.

Alternatively, the connection means is designed as a non-positive connection, making it possible to adjustably brace the at least one first outer band portion with the at least one first inner band portion.

Alternatively, the connection means is designed as a positive connection and also as a non-positive connection. This measure makes it possible to realize special embodiments, which make detachable connection means and easily manufacturable connection means combinable, and optimizable to the respective application. This results in a clamp band that is especially versatile in use.

The two ends of the clamp band are preferably arranged by abutment, as a result of which the clamp band is double-layered over a majority of its circumference. This measure results in the absorption of a high clamping force at a low material outlay, and ensures a high clamping effect, which acts along nearly the entire circumference of the clamp band and allows the cost-effective production of a robust clamp band.

The two ends are preferentially arranged by abutment externally on the inner band portion of the double-layered clamp band, thereby enabling a simple manufacture even given high quantities, and making it easy to check the pipe coupling for damage in the assembled state.

Alternatively, the two ends of the clamp band are arranged by abutment internally on the outer band portion of the double-layered clamp band. As a result of this internal arrangement, the two ends of the clamp band are arranged between the outside of the clamp band and the interior of the clamp band, which improves the clamping force of the clamp band.

Additional advantages, features and details of the invention may be gleaned from the following description, in which exemplary embodiments of the invention are described with reference to the drawings.

The reference list along with the technical content of the claims and figures are part of the disclosure. The figures are described coherently and comprehensively. The same references numbers signify the same components, while reference numbers with different indices denote functionally identical or similar components.

BRIEF DESCRIPTION OF THE DRAWING

Shown here are.

DETAILED DESCRIPTION

Figure 1:
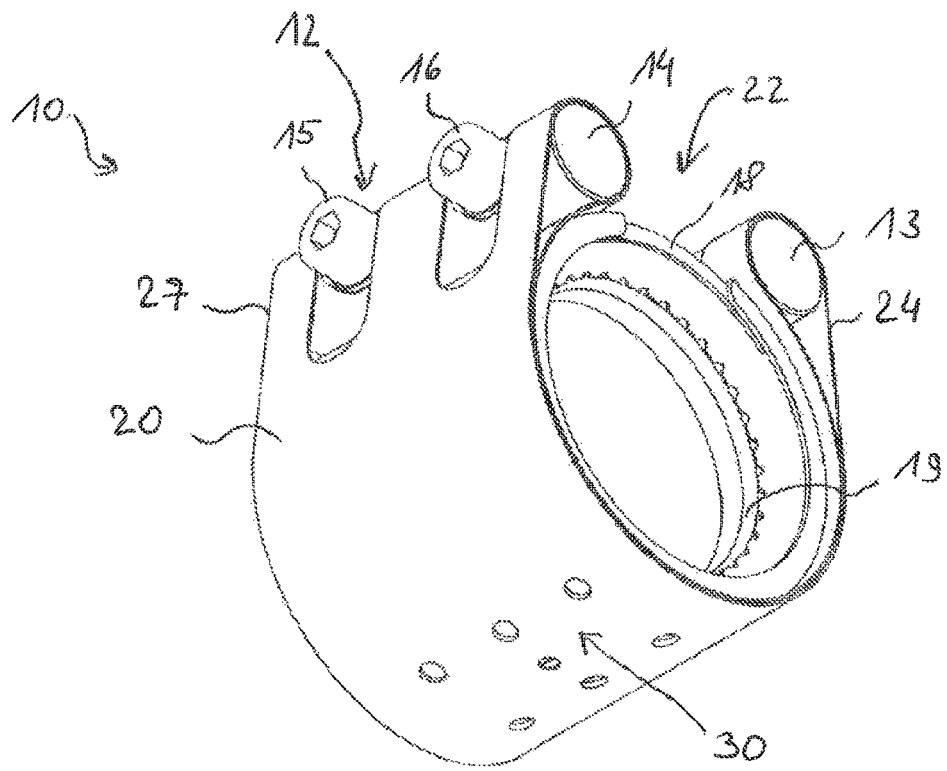
FIG. 1 A perspective view of a first embodiment of the pipe coupling according to the invention.

The pipe coupling 10 shown on FIGS. 1 to 5 for connecting two pipe ends comprises a clamp band 20, which is made out of a flat metal strip. The single piece clamp band 20 has two loops 24 and 27, which each have an area that faces the respective other loop 24 and 27. The loops 24 and 27 are spaced apart from each other, and a longitudinal slot 22 of the clamp band 20 is formed between them. The clamp band 20 is double-layered in design except for in the area of the loops 24 and 27. The ends 31 and 33 of the clamp band 20 are internally arranged by contact 29 on the side of the clamp band 20 lying opposite the longitudinal slot 22. The clamp band 20 there further has a connection assembly 30 for securing the inner housing 40 arranged therein in an axial direction. The pipe coupling 10 comprises a clamping mechanism 12, which can vary in design depending on the embodiment of the pipe coupling. The clamping mechanism 12 depicted here comprises two clamping bolts 13 and 14, which each are individually arranged in the two loops 24 and 27 of the clamp band 20, and two clamping means 15 and 16. The clamping means 15 and 16 are connected with the first clamping bolt 13. For example, the free ends of the clamping means 15 and 16 provided with an external thread engage into an internal thread formed on the clamping bolt 13. The clamping bolt 14 has a respective passage for the clamping means 15 and for the clamping means 16. Actuating the driving means of the clamping means 15 and 16 moves the clamping bolts 13 and 14 relative to each other, thereby bracing the pipe coupling 10. The pipe coupling 10 further comprises a bridging element 18 for bridging the longitudinal slot 22 and an interior sealing insert 19.

Figure 2:
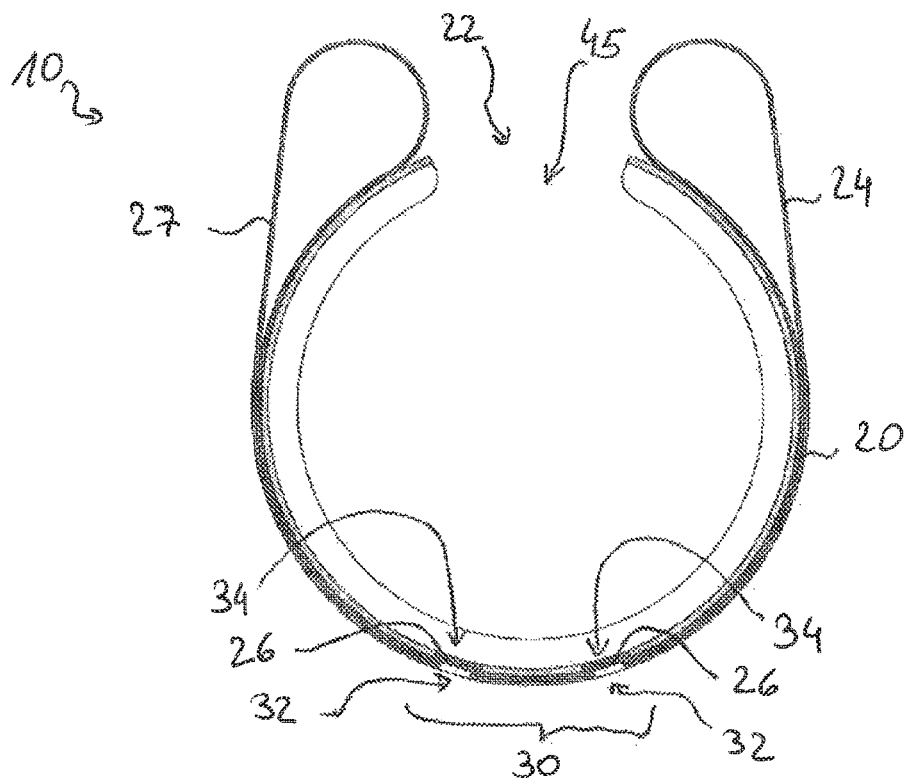
FIG. 2 A reduced, sectional view of the pipe coupling according to FIG. 1.
Figure 3:
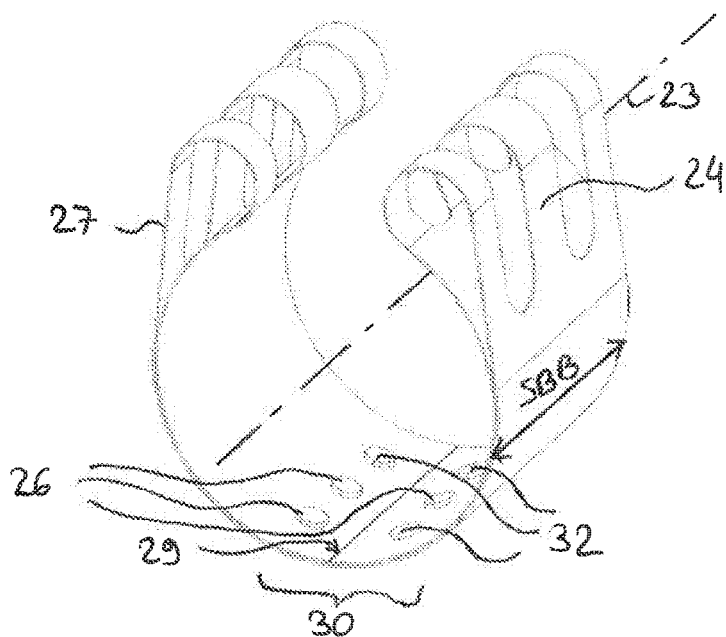
FIG. 3 A perspective view of the clamp band of the pipe coupling according to FIG. 1.
Figure 5:
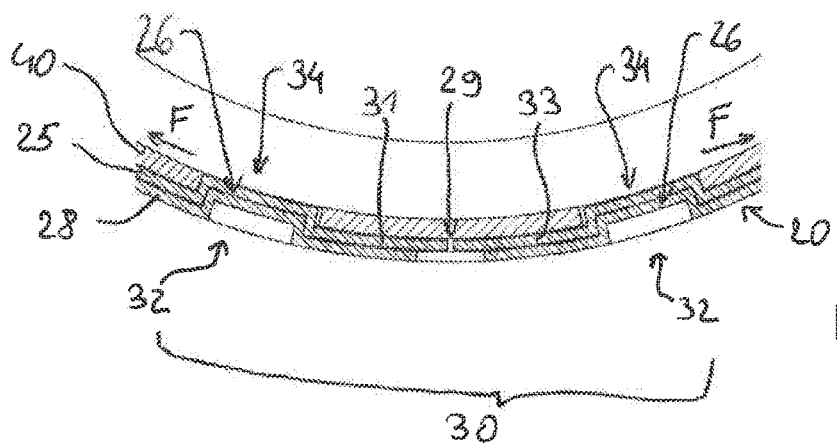
FIG. 5 A magnified, detailed section of the connection assembly of the pipe coupling according to FIG. 1.

The connection assembly 30 comprises first connection parts 32 and second connection parts 34, wherein the first connection parts 32 engage into the second connection parts 34 (see in particular FIGS. 2 and 5). In this embodiment, the first connection parts 32 are arranged on the clamp band 20, and the second connection parts 34 are arranged on the inner housing 40. The first connection parts 32 engage into the second connection parts 34 without play. As a result, the inner housing 40 is secured in the clamp band 20 on all sides, and an undesired positioning is prevented. The material thickness of the inner housing 40 is here larger than the material thickness of one layer of the clamp band 20.

The several first connection parts 32 on the clamp band 20 are each designed as a projection (see FIG. 3), which protrude radially inward in the direction of the longitudinal axis 23 of the clamp band 20. The clamp band 20 is double-layered in design in these areas, wherein the outer band portion 28 is connected with the inner band portions 25 by means of a respective connection means 26. In the embodiment shown, the connection means 26 is designed as a positive clinch connection, and the two ends 31 and 33 of the clamp band 20 are placed by abutment on the inside of the clamp band 20.

Figure 4:
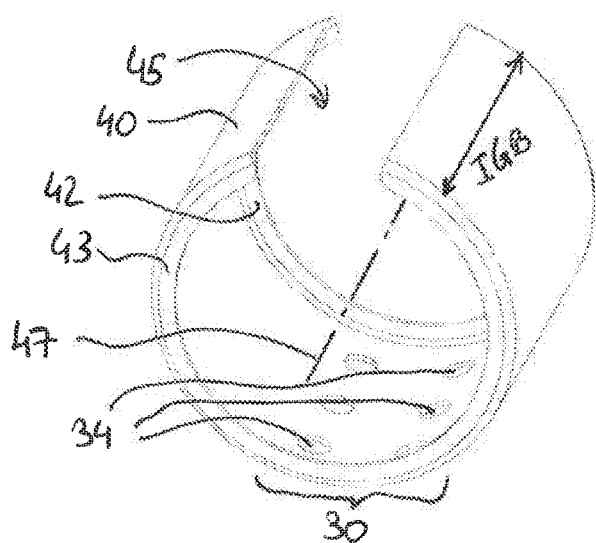
FIG. 4 A perspective view of the inner housing of the pipe coupling according to FIG. 1.

The tubular inner housing 40 is bent at its axial ends (see FIG. 4). The resultant side flanges 42, 43 serve to secure the sealing insert 19 in the inner housing 40 of the pipe coupling 10. The inner housing 40 has several second connection parts 34, which are here designed as a round hole. The several second connection parts 34 are arranged opposite a longitudinal slot 45 of the inner housing 40. The inner housing 40 has a smaller inner housing width IGB along its longitudinal axis 47 than the clamp band width SBB of the clamp band 20.

The connection assembly 30 of the pipe coupling 10 with the first connection parts 32 on the clamp band 20, which are designed as projections, and with the second connection parts 34 on the inner housing 40, which are designed as round holes, engage into each other and thereby secure the inner housing 40 on all sides, and in particular against a displacement of the inner housing 40 relative to the clamp band 20 in the axial direction (FIG. 5). The inner housing 40 is here carried along during the bracing of the pipe coupling 10, since a clamping force F directed along the casing periphery of the inner housing 40 acts on the first connection parts 32, and is directed in the respective direction moving away from the abutment 29. The inner housing 40 is further secured free of play given a precise design of the projections of the first connection parts 32 in relation to the round holes of the second connection parts 34.

As an alternative to the projections or openings, use can also be made of additional connection parts for a non-positive or positive connection. The connection means 26 that connects the respective inner band portion 25 with the outer band portion 28 of the clamp band 20 is simultaneously designed as a first connection part 32.

Figure 6:
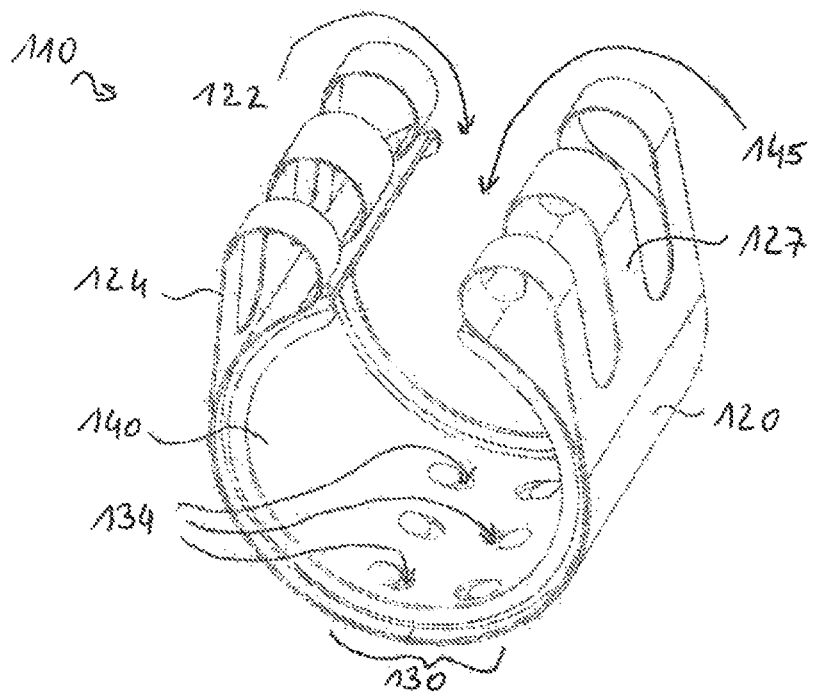
FIG. 6 A perspective view of another embodiment of the pipe coupling depicted on a reduced scale according to the invention.
Figure 7:
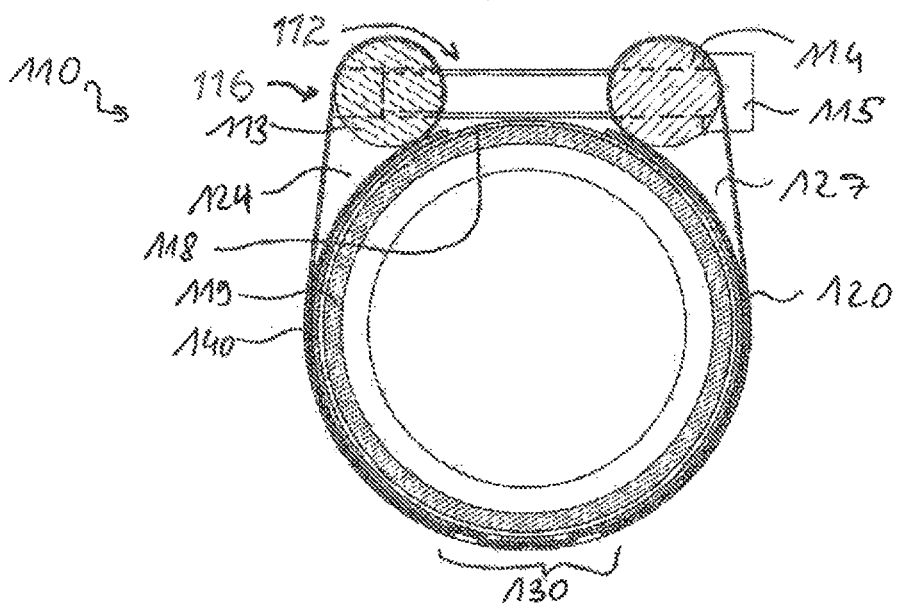
FIG. 7 A sectional view of the pipe coupling depicted on a reduced scale according to FIG. 6.
Figure 8:
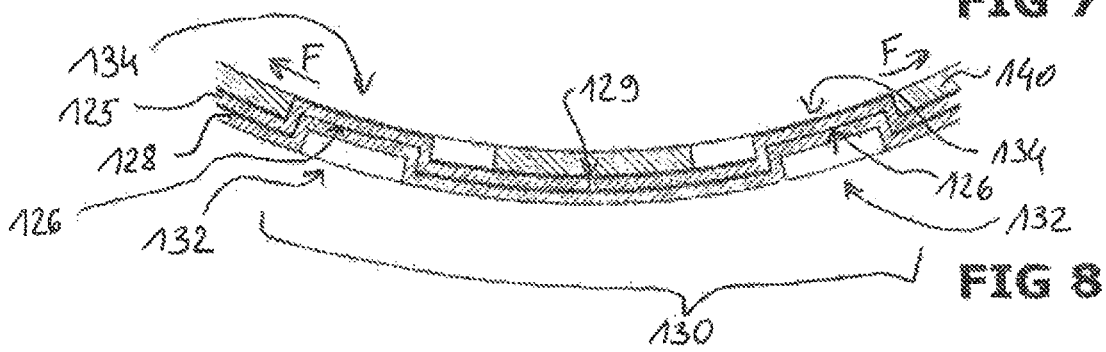
FIG. 8 A magnified, detailed view of the connection assembly of the pipe coupling according to FIG. 6.

FIGS. 6 to 8 show a pipe coupling 110 with the clamp band 120, which is similar in design to the clamp band 20, but has an alternatively configured inner housing 140. The connection assembly 130 likewise consists of the several first connection parts 132 and the several second connection parts 134. The first connection parts 132 are designed as projections on the clamp band 120, and the second connection parts 134 are each designed as oblong holes on the inner housing 140, wherein the longitudinal sides of the oblong holes extend along the periphery of the tubular inner housing 140. The longitudinal sides of an oblong hole run parallel along the shell surface of the inner housing 140. An oblong hole is understood as a hole that has sides spaced apart from each other widthwise and running identically, in particular parallel, to each other, the ends of which are terminated by semicircles, wherein the diameter of the semicircles corresponds to the width of the oblong hole. The connection assembly 130 is designed free of play along the longitudinal axis of the pipe coupling 10. The several second connection parts 134 are arranged opposite the longitudinal slot 145 of the inner housing 140.

The largely double-layered clamp band 120 forms two loops 124 and 127, which are spaced apart by a longitudinal slot 122, and each accommodate a clamping bolt 113, 114. The clamping mechanism 112 is here designed similarly to the embodiment depicted on FIGS. 1 to 5.

The connection assembly 130 with the first connection parts 132 on the clamp band 120, which are designed as projections, and with the second connection parts 134 on the inner housing 140, which are designed as oblong holes, engage into each other, and thereby secure the inner housing 140 (FIG. 8). The first connection parts 132 here extend into the second connection parts 134, wherein the first connection parts 132 abut against the sides of the second connection parts 134 spaced apart by the abutment 129. While bracing the clamping means 115 and 116, the first connection parts 132 are exposed to a clamping force F that presses the first connection parts 132 against the respective side of the second connection parts 134 spaced apart from the abutment 129. As a result, the inner housing 140 is carried along while bracing the clamp band 120.

Figure 9:
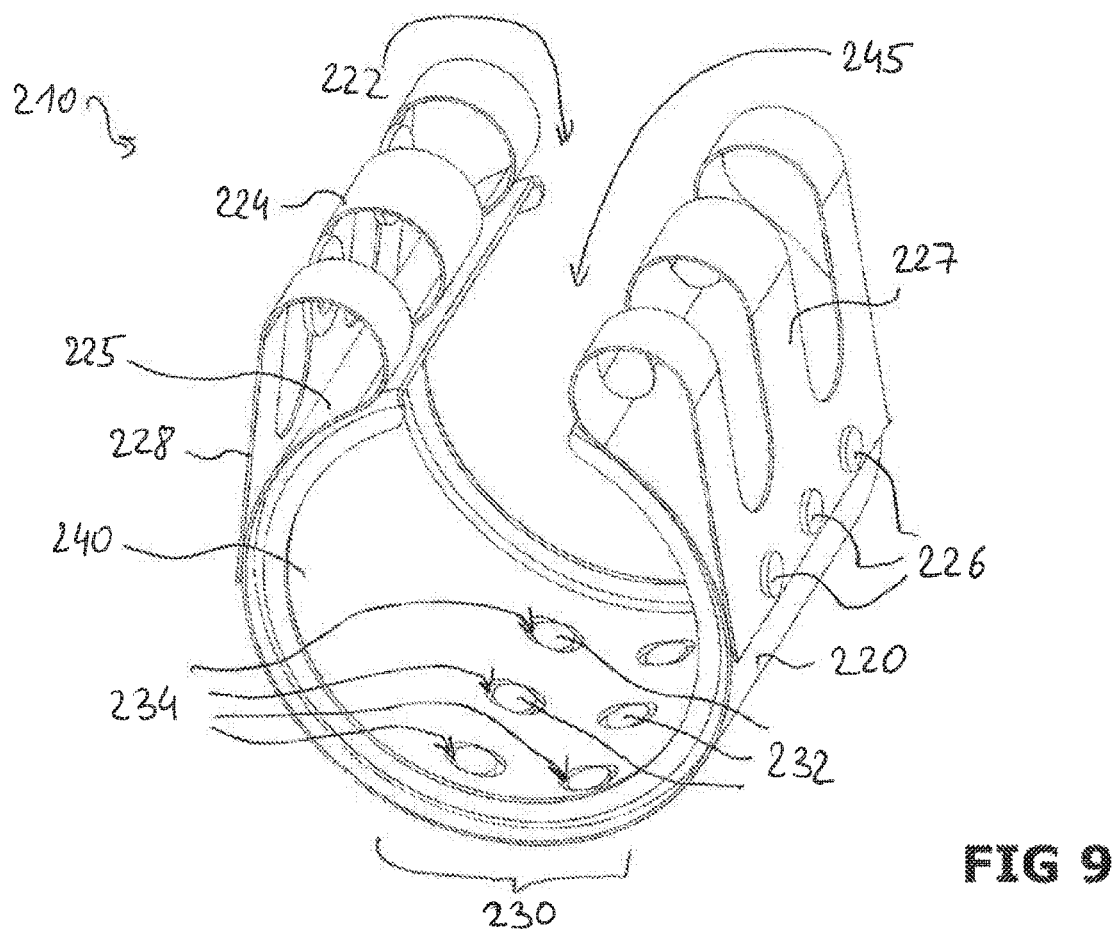
FIG. 9 A perspective view of another embodiment of the pipe coupling depicted on a reduced scale according to the invention.
Figure 10:
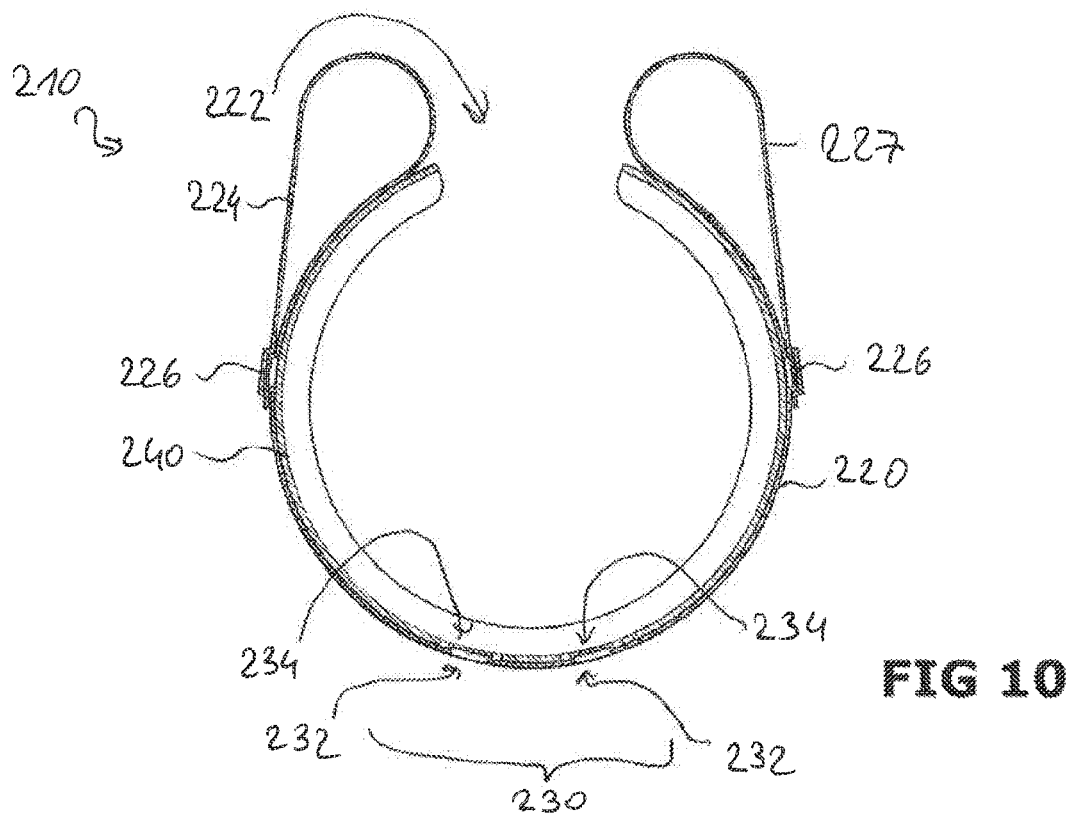
FIG. 10 A sectional view of the pipe coupling depicted on a reduced scale according to FIG. 9.

FIGS. 9 and 10 show a pipe coupling 210 with an alternatively designed clamp band 220 and an inner housing 240, which is arranged in the clamp band 220 and has a configuration corresponding to the inner housing 40 or 140 described previously. The clamp band 220 is single layer in design, wherein the outer band portion 228 is connected with the inner band portions 225 in the respective area of the loops 224 or 227 via the connection means 226. The clamp band 220 has projections as the first connection parts 232, which extend into the second connection parts 234 of the inner housing 240, which are designed as openings.

Figure 11:
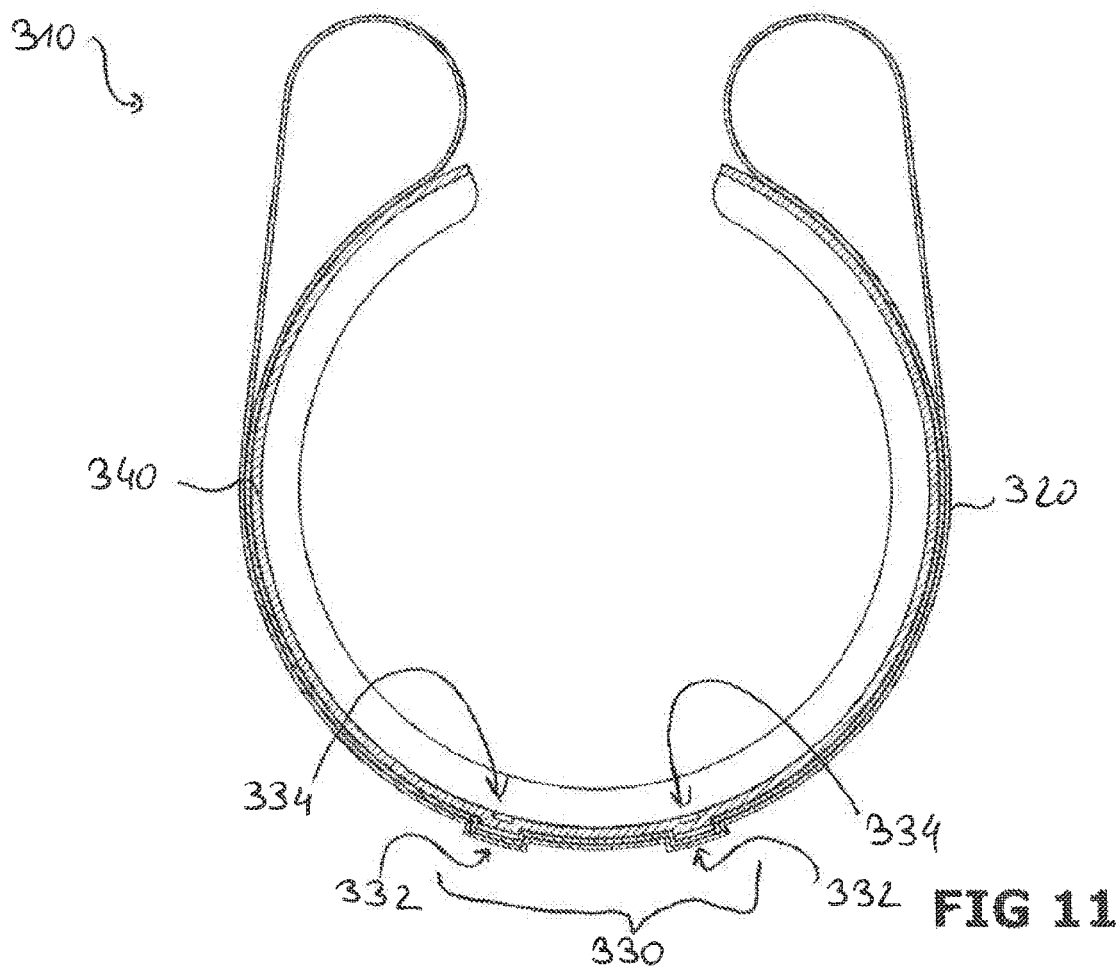
FIG. 11 A sectional view of another embodiment of the pipe coupling according to the invention.
Figure 12:
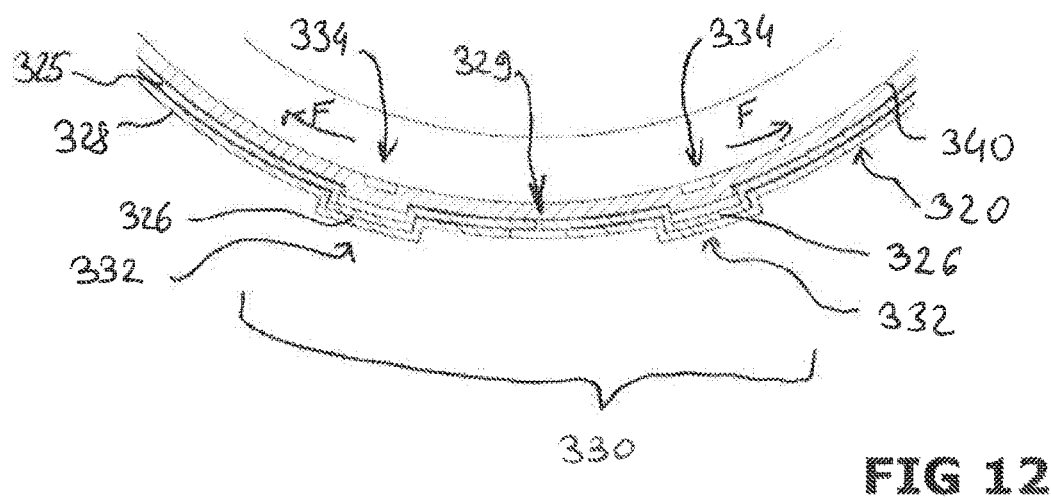
FIG. 12 A magnified, detailed view of the connection assembly of the pipe coupling according to FIG. 11.

FIGS. 11 and 12 show another alternative embodiment of the pipe coupling 310 (without depicted clamping mechanism) with a clamp band 320 and an inner housing 240, as well as a connection assembly 330 with several connection parts 332 and 334. The first connection parts 332 are each designed as a projection on the clamp band 320, and the second connection parts 334 are designed as projections on the inner housing 340. The projections on the clamp band 320 have depressions on their inside.

The second connection parts 334 extend into the first connection parts 332, wherein the second connection parts 334 engage into the first connection parts 332 precisely and free of play. The first connection parts 332 are further designed as connection means 326, and connect the outer band portions 328 with the inner band portions 325 of the clamp band 320. While bracing the clamping means 115 and 116, the second connection parts 334 are exposed to a clamping force F, which presses the second connection parts 334 against the respective side of the first connection parts 332 spaced apart from the abutment 329.

Figure 13:
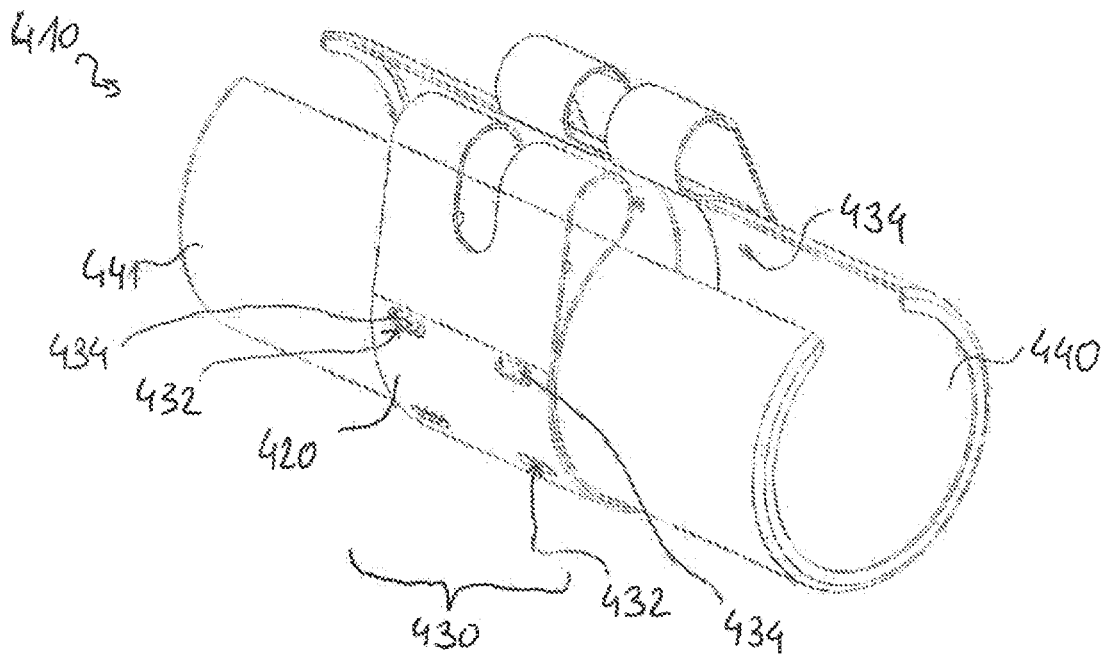
FIG. 13 A perspective view of another embodiment of the pipe coupling depicted on a reduced scale according to the invention.
Figure 14:
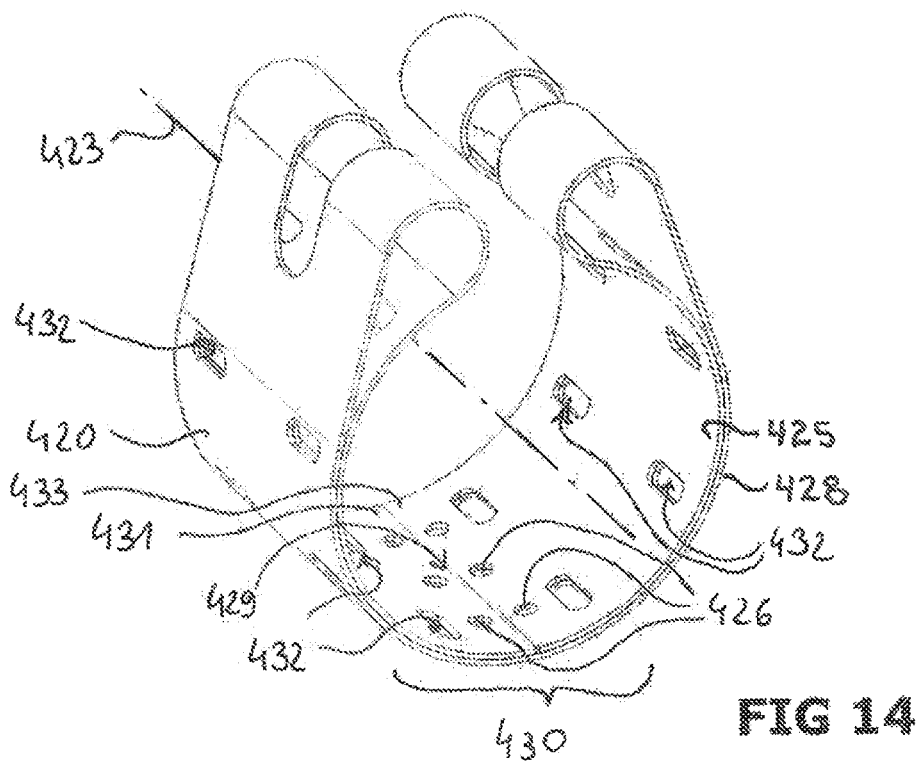
FIG. 14 A perspective view of the pipe coupling depicted on a reduced scale according to FIG. 13.
Figure 15:
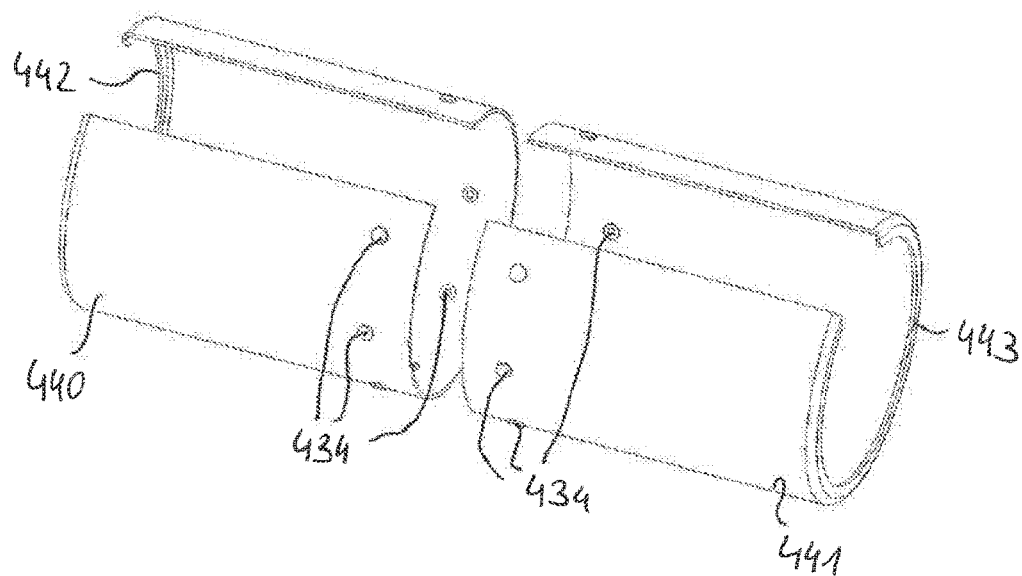
FIG. 15 A separate, perspective view of the two inner housings of the pipe coupling according to FIG. 13.

FIGS. 13 to 15 show a pipe coupling 410 (without a depicted clamping mechanism) with a clamp band 420 and a first inner housing 440 as well as a second inner housing 441, which both are arranged at least regionally in the clamp band 420. Further depicted is a connection assembly 430 with several connection parts 432 and 434, wherein the first connection parts 432 are arranged on the clamp band 420, and the second connection parts 434 are each arranged on the two inner housings 440 and 441. The first connection parts 432 are designed as openings on the clamp band 420, and the second connection parts 434 are designed as projections on the two inner housings 440 and 441. The projections of the two inner housings 440 and 441 here engage into the openings on the clamp band 420.

The several connection parts 432 on the clamp band 420 are each designed as oblong holes, which run along the direction of the longitudinal axis 423 of the clamp band 420 on the shell surface of the clamp band 420 (FIG. 14). The clamp band 420 is double-layered in design in these areas, while the outer band portion 428 is connected with the inner band portions 425 via connection means 426, and the two ends 431 and 433 of the clamp band 420 on the inside lie by abutment on the outer band portion 428. A single-layer clamp band is alternatively also available in this embodiment (not shown). For example, the oblong holes run along a curve on the respective shell surface of the two inner housings 440 and 441 or on the clamp band 420 (not shown), thereby providing variability in the angulation of the pipes to be connected relative to each other, and compensating for the longitudinal axis misalignment of the two pipes that come together.

The tubular inner housings 440 and 441 are bent at their axial ends facing away from each other. The resultant side flanges 442, 443 serve to secure the sealing insert 419 in the two inner housings 440 and 441 of the pipe coupling 410.

The axial end regions of the tubular inner housings 440 and 441 lying opposite the side flanges 442 or 443 have several connection parts 434, which are formed on the shell surface of the respective inner housing 440 and 441 as radially continuous and radially outwardly protruding projections (FIG. 15).

Figure 16:
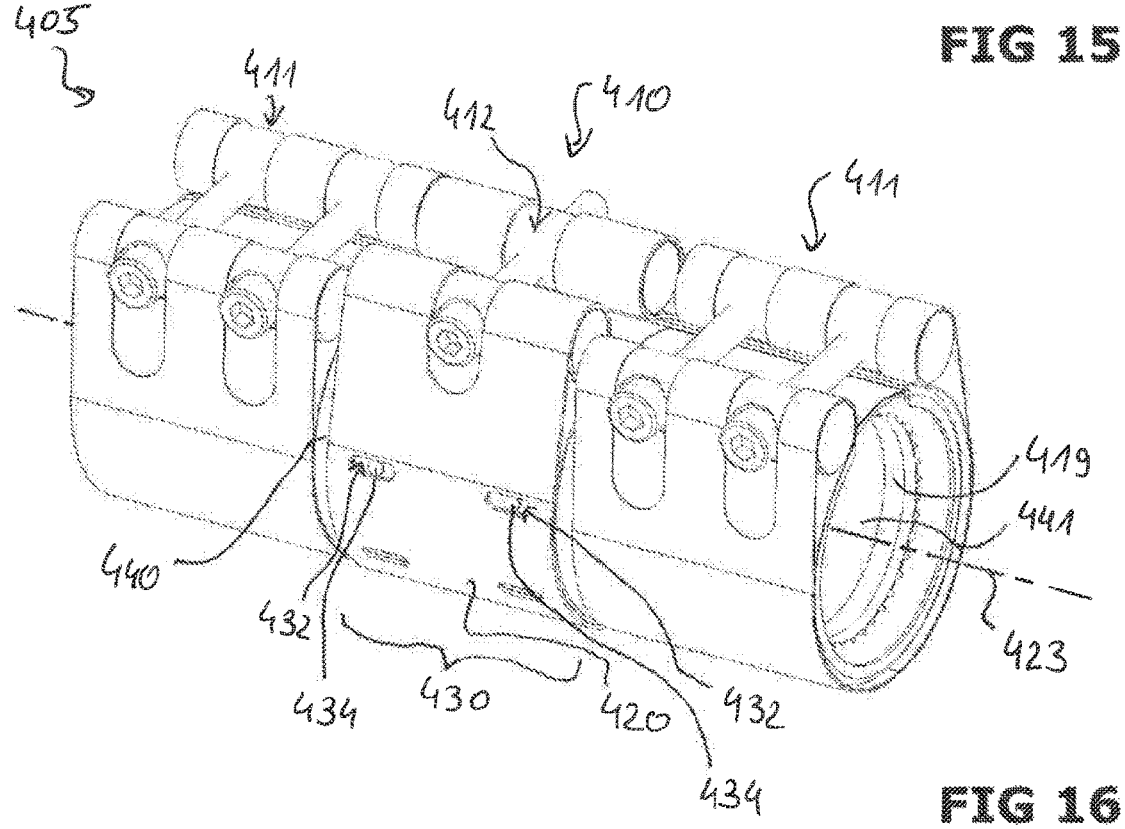
FIG. 16 A perspective view of a pipe coupling assembly.

FIG. 16 shows a pipe coupling assembly 405 that comprises a pipe coupling 410 and two pipe couplings 411. The two inner housings 440 and 441 are arranged in the clamp band 420 of the pipe coupling 410 via the second connection means 434 designed as a projection, and are there held by the first connection parts 432 designed as oblong holes. The oblong holes in the clamp band 420 thus allow the projections of the two inner housings 440 and 441 arranged therein to move in a defined and limited manner along and transversely to the longitudinal axis 423 of the clamp band 420.

The pipes secured in the respective inner housings 440 and 441 (not shown) are held by the two pipe couplings 411 and braced by means of their clamping mechanisms. The pipe couplings 411 are here designed as conventional pipe couplings, or are designed similarly to the pipe couplings 410.

The connection means on FIGS. 1 to 16 are designed as a positive clinch connection. Instead of the clinch connection or in addition thereto, use can also be made of alternative, positive connection means as well as non-positive connection means. The list of possible options includes, but is not limited to, screws, rivets or dowel pins.

Figure 17:
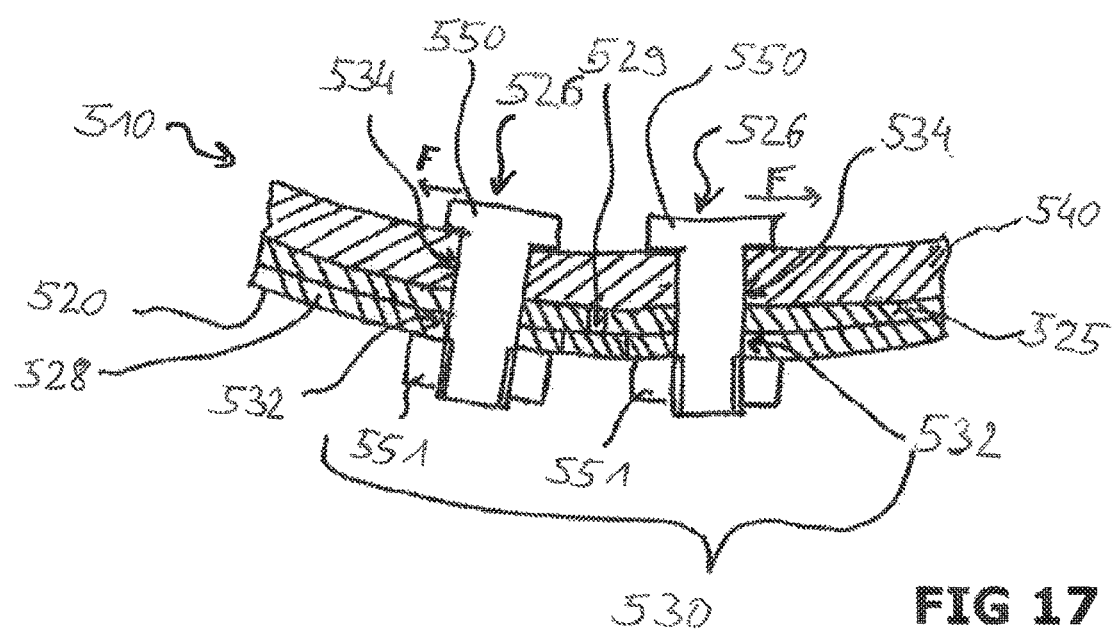
FIG. 17 A magnified, detailed section of an alternative connection assembly for a pipe coupling according to one of the preceding FIGS. 1 to 16.

FIG. 17 shows another embodiment of a connection assembly 530, which as an alternative to the connection assemblies 30, 130, 230, 330 and 430 shown there can be arranged on one of the previously depicted connection couplings 10, 110, 210, 310 and 410. The connection assembly 530 comprises first connection parts 532 on the clamp band 520, which are designed as openings, as well as second connection parts 534 on the inner housing 540, which are also designed as openings. The connection assembly 530 further comprises connection means 526, which are designed as screws 550 with nuts 551. The screws 550 each extend through the connection parts 532 and through the second connection parts 534. At one screw end facing the inside of the pipe coupling 510, the screws 550 have a stop, in particular a screw head, which presses against the inner housing 540. The screw end facing the outside of the pipe coupling 510 is provided with a nut 551. In the tightened state of the connection means 526, the nut presses against the outside of the clamp band 520 of the pipe coupling 510. This connection means 526 thus makes it possible to adjustably and detachably secure the inner housing 540 with the clamp band 520. While bracing the clamping mechanism of the pipe coupling 510, the first connection parts 532 are exposed to a clamping force F, which is transferred via the connection means 526 to the second connection parts 534, thereby realizing a jointly carrying inner housing 540 in the pipe coupling 510.

REFERENCE LIST

| | |
|---|---|
| 10 | Pipe coupling |
| 12 | Clamping mechanism |
| 13 | First clamping bolt |
| 14 | Second clamping bolt |
| 15 | First clamping means |
| 16 | Second clamping means |
| 18 | Bridging element |
| 19 | Sealing insert |
| 20 | Clamp band |
| 22 | Longitudinal slot of 20 |
| 23 | Longitudinal axis of 20 |
| 24 | First loop |
| 25 | Inner band portion |
| 26 | Connection means |
| 27 | Second loop |
| 28 | Outer band portion |
| 29 | Abutment |
| 30 | Connection assembly |
| 31 | First end of 20 |
| 32 | First connection part |

| | |
|---|---|
| 33 | Second end of 20 |
| 34 | Second connection part |
| 40 | Inner housing |
| 42 | First side flange |
| 43 | Second side flange |
| 45 | Longitudinal slot of 40 |
| 47 | Longitudinal axis of 40 |
| 110 | Pipe coupling |
| 112 | Clamping mechanism |
| 113 | First clamping bolt |
| 114 | Second clamping bolt |
| 115 | First clamping means |
| 118 | Bridging element |
| 119 | Sealing insert |
| 120 | Clamp band |
| 122 | Longitudinal slot of 20 |
| 124 | First loop |
| 125 | Inner band portion |
| 126 | Connection means |
| 127 | Second loop |
| 128 | Outer band portion |
| 129 | Abutment |
| 130 | Connection assembly |
| 132 | First connection part |
| 134 | Second connection part |
| 140 | Inner housing |
| 145 | Longitudinal slot of 40 |
| 210 | Pipe coupling |
| 220 | Clamp band |
| 222 | Longitudinal slot of 220 |
| 224 | First loop |
| 225 | Inner band portion |
| 226 | Connection means |
| 227 | Second loop |
| 228 | Outer band portion |
| 230 | Connection assembly |
| 232 | First connection part |
| 234 | Second connection part |
| 240 | Inner housing |
| 245 | Longitudinal slot of 240 |
| 310 | Pipe coupling |
| 320 | Clamp band |
| 325 | Inner band portion |
| 326 | Connection means |
| 327 | Second loop |
| 328 | Outer band portion |
| 329 | Abutment |
| 330 | Connection assembly |
| 332 | First connection part |
| 334 | Second connection part |
| 340 | Inner housing |
| 405 | Pipe coupling assembly |
| 410 | Pipe coupling |
| 411 | Additional pipe coupling |
| 419 | Sealing insert |
| 420 | Clamp band |
| 423 | Longitudinal axis of 420 |
| 425 | Inner band portion |
| 426 | Connection means |
| 427 | Second loop |
| 428 | Outer band portion |
| 429 | Abutment |
| 430 | Connection assembly |
| 431 | First end of 420 |
| 432 | First connection part |
| 433 | Second end of 420 |
| 434 | Second connection part |
| 440 | First inner housing |
| 441 | Second inner housing |
| 510 | Pipe coupling |
| 525 | Inner band portion |
| 526 | Connection means |
| 528 | Outer band portion |
| 529 | Abutment |
| 530 | Connection assembly |
| 532 | First connection part |
| 534 | Second connection part |
| 540 | Inner housing |
| 550 | Screw |
| 551 | Nut |
| IGB | Inner housing width |
| SBB | Clamp band width |
| F | Clamping force |

The invention claimed is:

1. A pipe coupling (10; 110; 210; 310; 410; 510) for connecting two pipe ends, comprising:
a clamp band (20; 120; 220; 320; 420; 520) and at least one inner housing (40; 140; 240; 340; 440; 441; 540) arranged at least regionally therein, wherein the clamp band (20; 120; 220; 320; 420; 520) has a longitudinal slot (22; 122; 222), and a clamping mechanism (12; 112; 212; 412) for reducing the internal diameter of the clamp band (20; 120; 220; 320; 420; 520), wherein the clamp band (20; 120; 220; 320; 420; 520) is further designed as a flat, single piece, and also has at least one first outer band portion (28; 128; 228; 328; 428; 528) and at least one first inner band portion (25; 125; 225; 325; 425; 525), which are connected via at least one connection means (26; 126; 226; 326; 426; 526); and
a connection assembly (30; 130; 230; 330; 430; 530) is provided for securing the at least one inner housing (40; 140; 240; 340; 440; 441; 540) in the clamp band (20; 120; 220; 320; 420; 520), which consists of at least one first connection part (32; 132; 232; 332; 432; 532) and at least one second connection part (34; 134; 234; 334; 434; 534),
wherein the at least one first connection part (32; 132; 232; 332; 432; 532) extends into the at least one second connection part (34; 134; 234; 334; 434; 534), and
wherein at least one of the connection parts (32, 34; 132, 134; 232, 234; 332, 334; 432, 434; 532, 534) of the connection assembly (30; 130; 230; 330; 430; 530) is designed as the at least one connection means (26; 126; 226; 326; 426; 526) for connecting the at least one outer band portion (28; 128; 228; 328; 428; 528) with the at least one first inner band portion (25; 125; 225; 325; 425; 525).

2. The pipe coupling according to claim 1, wherein at least one of the connection parts (32, 34; 132, 134; 232, 234; 332, 334; 432, 434; 532, 534) has a recess.

3. The pipe coupling according to claim 1, wherein at least one of the connection parts (32, 34; 132, 134; 232, 234; 332, 334; 432, 434; 532, 534) is designed as an opening.

4. The pipe coupling according to claim 3, wherein the at least one first connection part (32; 132; 232; 332; 432; 532) extends beyond the at least one second connection part (34; 134; 234; 334; 434; 534).

5. The pipe coupling according to claim 3, wherein the opening is one of a round hole and an oblong hole.

6. The pipe coupling according to claim 1, wherein the at least one first connection part (32; 132; 232; 332; 432; 532) engages precisely into the at least one second connection part (34; 134; 234; 334; 434; 534).

7. The pipe coupling according to claim 1, wherein at least one first connection part (32; 132; 232; 332; 432; 532) is arranged on the clamp band (20; 120; 220; 320; 420; 520), and that at least one second connection part (34; 134; 234; 334; 434; 534) is arranged on at least one inner housing (40; 140; 240; 340; 440; 441; 540).

8. The pipe coupling according to claim 1, wherein the connection assembly (30; 130; 230; 330; 430; 530) has the at least one connection means (26; 126; 226; 326; 426; 526) for connecting the at least first outer band portion (28; 128;

228; 328; 428; 528) with the at least first inner band portion (25; 125; 225; 325; 425; 525).

9. The pipe coupling according to claim 1, wherein at least one first connection part (32; 132; 232; 332; 432; 532) of the connection assembly (30; 130; 230; 330; 430; 530) is formed on the clamp band (20; 120; 220; 320; 420; 520) and at least one second connection part (34; 134; 234; 334; 434; 534) of the connection assembly (30; 130; 230; 330; 430; 530) is formed on the at least one inner housing (40; 140; 240; 340; 440; 441; 540) as an opening, wherein the at least one connection means (26; 126; 226; 326; 426; 526) for detachably connecting the clamp band (20; 120; 220; 320; 420; 520) with the at least one inner housing (40; 140; 240; 340; 440; 441; 540) extends through the respective openings.

10. The pipe coupling according to claim 1, wherein the connection assembly (30; 130; 230; 330; 430; 530) is arranged in an area opposite the longitudinal slot (22; 122; 222) of the clamp band (20; 120; 220; 320; 420; 520) and/or the two ends (31, 33; 431, 433) of the clamp band (20; 120; 220; 320; 420; 520) are arranged on an abutment (29; 129; 229; 329; 429; 529).

11. The pipe coupling according to claim 1, wherein the connection assembly (30; 130; 230; 330; 430; 530) is designed as a positive connection.

12. The pipe coupling according to claim 1, wherein the at least one inner housing (40; 140; 240; 340; 440; 441; 540) has a longitudinal slot (45; 145; 245) and/or at least one side flange (42, 43; 142, 143; 242; 243; 442; 443) and or the at least one inner housing (40; 140; 240; 340; 440; 441; 540) has a smaller inner housing width (IGB) along its longitudinal axis than a clamp band width (SBB) of the clamp band (20; 120; 220; 320; 420; 520).

13. The pipe coupling according to claim 1, wherein the connection assembly (30; 130; 230; 330; 430; 530) is designed as a non-positive connection.

* * * * *